United States Patent [19]
Kimura et al.

[11] Patent Number: 5,889,916
[45] Date of Patent: *Mar. 30, 1999

[54] VIDEO DATA RECORDING APPARATUS

[75] Inventors: Katsumi Kimura; Kenji Maekawa; Shigeru Kato; Masataka Mukai; Masao Naito; Kiyoshi Inoue; Takeo Nishijima, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 786,084

[22] Filed: Jan. 17, 1997

[30] Foreign Application Priority Data

Jan. 19, 1996 [JP] Japan ................................. 8-007828

[51] Int. Cl.[6] .............................. H04N 5/93; H04N 5/91
[52] U.S. Cl. ............................................ 386/52; 386/46
[58] Field of Search ................................ 386/83, 52, 46, 386/117, 107, 4, 64, 81; 360/72; H04N 5/93, 5/91

[56] References Cited

U.S. PATENT DOCUMENTS

| 4,338,644 | 7/1982 | Staar | 360/132 |
| 4,879,611 | 11/1989 | Fukui et al. | 360/69 |
| 4,977,455 | 12/1990 | Young | 386/83 |
| 5,621,536 | 4/1997 | Kizu | 386/52 |

*Primary Examiner*—Robert Chevalier
*Attorney, Agent, or Firm*—Frommer Lawrence & Haug LLP; William S. Frommer

[57] ABSTRACT

A video data recording apparatus for recording video data using a tape-like recording medium accommodated in a cassette provided with a semiconductor memory by which it is possible to suitably determine the cuts and make effective use of the semiconductor memory to enable efficient editing. The user can mark the recorded video data with the desired starting position and ending position of the video data. The marked cuts are used to extract the index picture and, at the same time, the recording positions of the cuts and an index picture on the tape recording medium are recorded in the semiconductor memory.

15 Claims, 8 Drawing Sheets

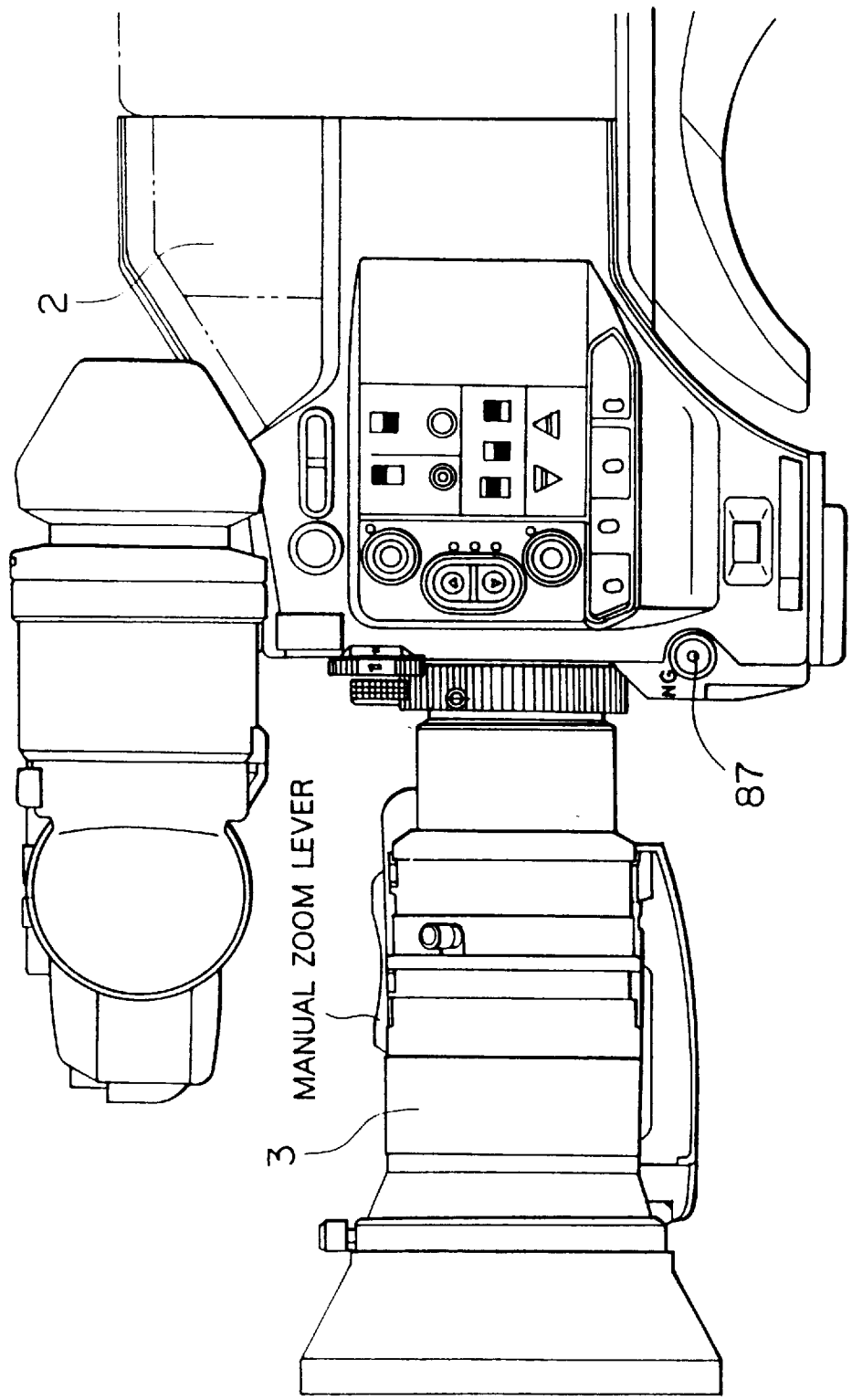

FIG 5C

| | 7 | | | | | | | 0 | | 7 | | | | | | | 0 |
|---|---|---|---|---|---|---|---|---|---|---|---|---|---|---|---|---|---|
| 1 | FD (PC 1) | | | | | | | | FD (PC 2) | | | | | | | | |
| 2 | 2 | 1 | | | Take No | | | | 2 | 1 | | H | | | | | |
| 3 | 0 | Scene No | | | | | | | 0 | | | M | | | | | |
| 4 | OK | | | | | | | | | | | S | | | | | |
| 5 | | | | | | | | | | | | | | | | | |

OUT POINT RELATIVE VALUE ⎯⎯ OUT POINT RELATIVE VALUE

FIG. 5D

| | 7 | | | 0 |
|---|---|---|---|---|
| 1 | FD (PC Add) | | | |
| 2 | 2 | 1 | H | |
| 3 | 0 | | M | |
| 4 | | | S | |
| 5 | | | F | |

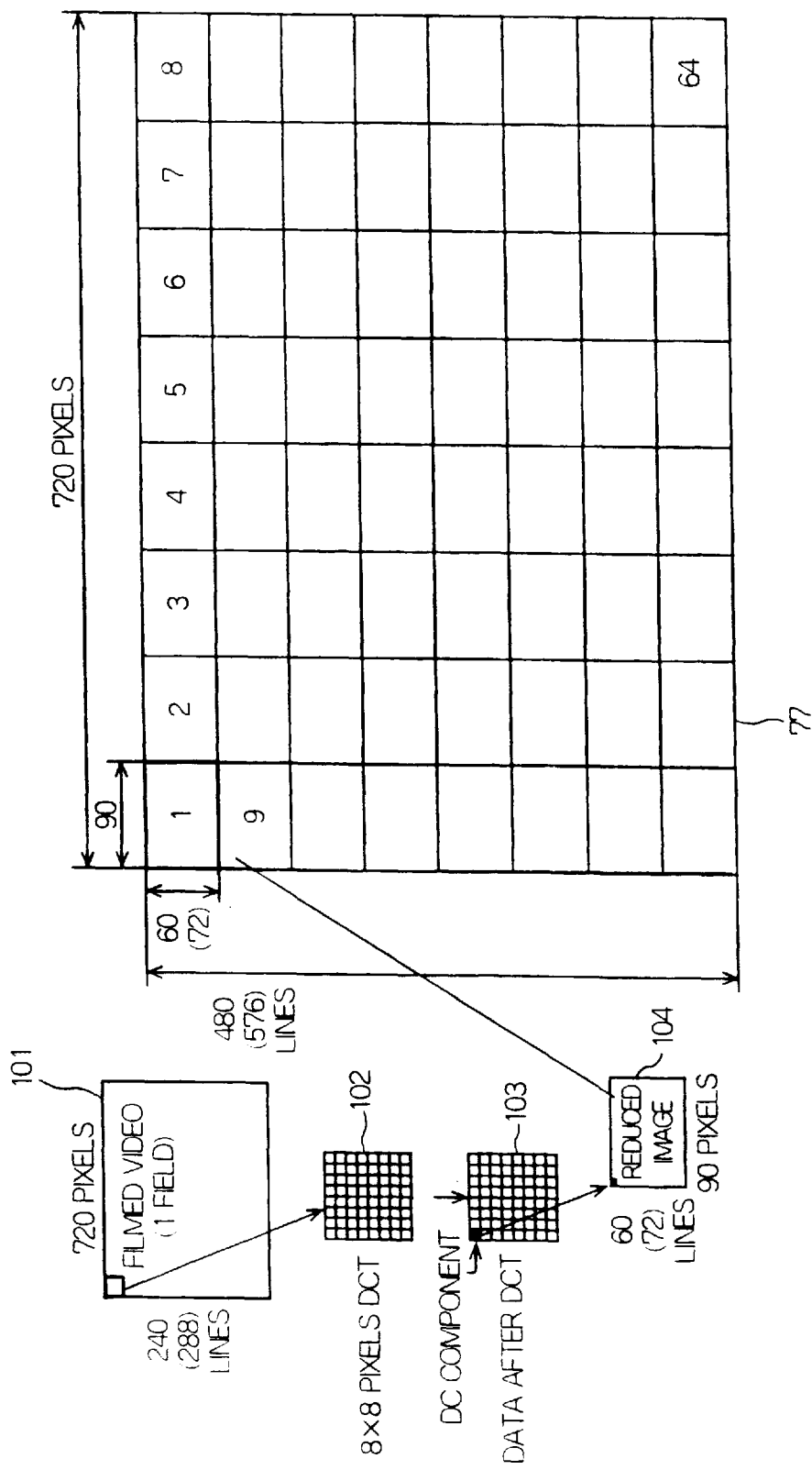

VIDEO DATA RECORDING APPARATUS

BACKGROUND OF THE INVENTION

1. Field of the Invention

The present invention relates to a video data recording apparatus by which recorded video data can be edited with a good efficiency.

2. Description of the Related Art

The video data taken by a television camera or other camera apparatus is frequently edited and then assembled into a program, movie, etc. For example, a television broadcasting station extracts the required cuts (video data to be edited obtained by suitably recording a certain matter) from among the video data obtained through coverage and prepares the video data comprised of the desired cuts connected with each other. In order to carry out such editing with a good efficiency, it is important to suitably determine the cuts from among the filmed video data and be able to retrieve the cuts at a high speed.

As methods enabling the retrieval and editing of video data to be carried out at a high speed, there are the methods described in Japanese Patent Application Nos. 5-329841 and 5-329842 by the assignee of the present application. In these methods, when recording video data and audio data on a recording medium, compressed index information concerning the data is generated and the index information is continuously recorded on another recording medium or in a recording region of the original data of the same recording medium. By referring to that index information to prepare the edited data, it is possible to eliminate the processing on the original data and thereby to carry out the work with a good efficiency.

However, in the TV cameras and video camcorders (VTR apparatuses with built-in cameras) which have been used heretofore, when trying to shoot something which could not have been expected, it is necessary to continuously run the camera etc. and extract the cuts in which the matter is suitably recorded from among the recorded video data. Thus there arises a disadvantage of a reduction of the efficiency of the editing work.

Further, it has become possible to record a long period of video data by a recording medium such as a video tape, so the number of the cuts which can be recorded on one recording medium has naturally been increased and therefore a demand has arisen for enabling desired cuts to be retrieved with a higher efficiency.

Particularly, in a video cassette comprising a video tape accommodated in a cassette incorporating a semiconductor memory element such as a flash memory, there is a demand for enabling the editing of the recorded video data to be carried out with a good efficiency by effectively using the semiconductor memory.

SUMMARY OF THE INVENTION

An object of the present invention is to provide a video data recording apparatus for recording video data using a tape-like recording medium accommodated in a cassette provided with a semiconductor memory by which it is possible to suitably determine the cuts and make effective use of the semiconductor memory to enable efficient editing.

In order to achieve the above object, it has been made possible for the user to mark the recorded video data with the desired starting position and ending position of the video data. The marked cuts are used to extract the index picture and, at the same time, the recording positions of the cuts and index picture on the tape recording medium are recorded in the semiconductor memory.

According to the present invention, there is provided a video data recording apparatus for recording video data on a tape-like recording medium accommodated in a cassette provided with a semiconductor memory, comprising a recording indicating means for receiving as its input an indication of a recording start and recording end of the video data input on the recording medium, an input video data recording means for successively recording the input video data on the tape-like recording medium based on the indication of the recording start and recording end input to the recording indicating means, a desired video data informing means for informing that the input of the desired video data is started or the input of the desired video data is ended with respect to the input video data, a valid video data detecting means for detecting the time when the input start is informed from the desired video data informing means as the start position of the valid video, detecting the time when the input end is informed from the desired video data informing means as the ending position of the valid video, and detecting the video data input during a term from the start position to the ending position as the valid video data, and a positional information recording means for recording information indicating the recording position of the detected valid video data in the recording medium in the semiconductor memory.

Preferably, a video data recording apparatus according to the present invention further comprises an index video data generating means for generating index video data from the detected valid video data for identifying the valid video data and an index video data recording means for recording the generated index video data on the recording medium and the positional information recording means records the information indicating the recording positions of the valid video data and the index video data in the recording medium in the semiconductor memory.

Preferably, the index video data generating means generates the data of the head of the detected valid video data as the index video data.

Preferably, the index video data generating means has an index video data extracting means for extracting the index video data for identifying the valid video data from the detected valid video data and a frame index video data generating means for generating the index video data by successively arranging the index video data on one screen by reducing the extracted index video data, and the index video data recording means records the index video data successively arranged in the video data of one frame on the recording medium.

Preferably, the valid video data detecting means detects the time when the indication of the recording start is input to the recording starting means and the time when the input start of the desired video data is informed to the desired video data informing means as the starting position of the valid video data and detects the time when the indication of the recording end is input to the recording indicating means and the time when the input end of the desired video data is informed to the desired video data informing means as the ending position of the valid video data to detect the valid video data.

Preferably, the valid video data detecting means detects the starting position detected later as the starting position of the valid video data in a case where, after the starting position of the valid video data is detected, the starting position is further detected before the ending position of the valid video data is detected and detects the ending position detected later as the ending position of the valid video data in a case where, after the ending position is detected, the ending position is further detected before the starting position is detected to detect the valid video data.

Preferably, the valid video data detecting means corrects the starting position and ending position of the detected valid video data to positions a predetermined time before, respectively, and detects the video data input during a term of from the corrected starting position to ending position as the valid video data.

Preferably, the index video data recording means records the index video data in the region continuing from the input video data whose recording on the recording medium is ended immediately after the ending of recording of the input video data, and the input video data recording means updates the index video data from the region in which the index video data is recorded so that the video data which is continuously input is continuously recorded on the recording medium so as to record the next input video data.

Preferably, a video data recording apparatus according to the present invention further comprises a cancellation informing means for carrying out notification indicating that the input video data is not the desired video data and the valid video detecting means withdraws the designation of the valid video data corresponding to the detected starting position when detecting a notification indicating that the input valid video data is not the desired video data by the cancellation informing means after the starting position of the valid video data is detected and at the latest before the starting position of the next valid video data is detected.

Preferably, a video data recording apparatus according to the present invention further comprises a camera apparatus for shooting an image and outputting the input video data.

Preferably, the recording indicating means and the desired video data informing means are provided at close positions so that the cameraman carrying out the shooting can operate them both.

BRIEF DESCRIPTION OF THE DRAWINGS

These and other objects and features of the present invention will become clearer from the following description of the preferred embodiments given with reference to the attached drawings, in which:

FIG. 4 is a view of the front portion of a digital camcorder from the side surface on which a zoom lens is mounted for explaining an operation/display unit of the digital camcorder shown in FIG. 1;

FIGS. 5A to 5D are views of the configuration of a semiconductor memory of a video cassette tape recorded on by the digital camcorder shown in FIG. 1, wherein FIG. 5A is a view of the memory space of the cassette memory;

FIG. 5B is a view of the data configuration of a space 0;

FIG. 5C is a view of the configuration of the data pack showing the positions of a mark-in point and a mark-out point of a cut, and FIG. 5D is a view of the configuration of the data pack showing the position of an index image;

FIG. 6 is a view for explaining the method of generating the index image in the index image generating unit of the digital camcorder shown in FIG. 1.

DESCRIPTION OF THE PREFERRED EMBODIMENTS

Figure 1:
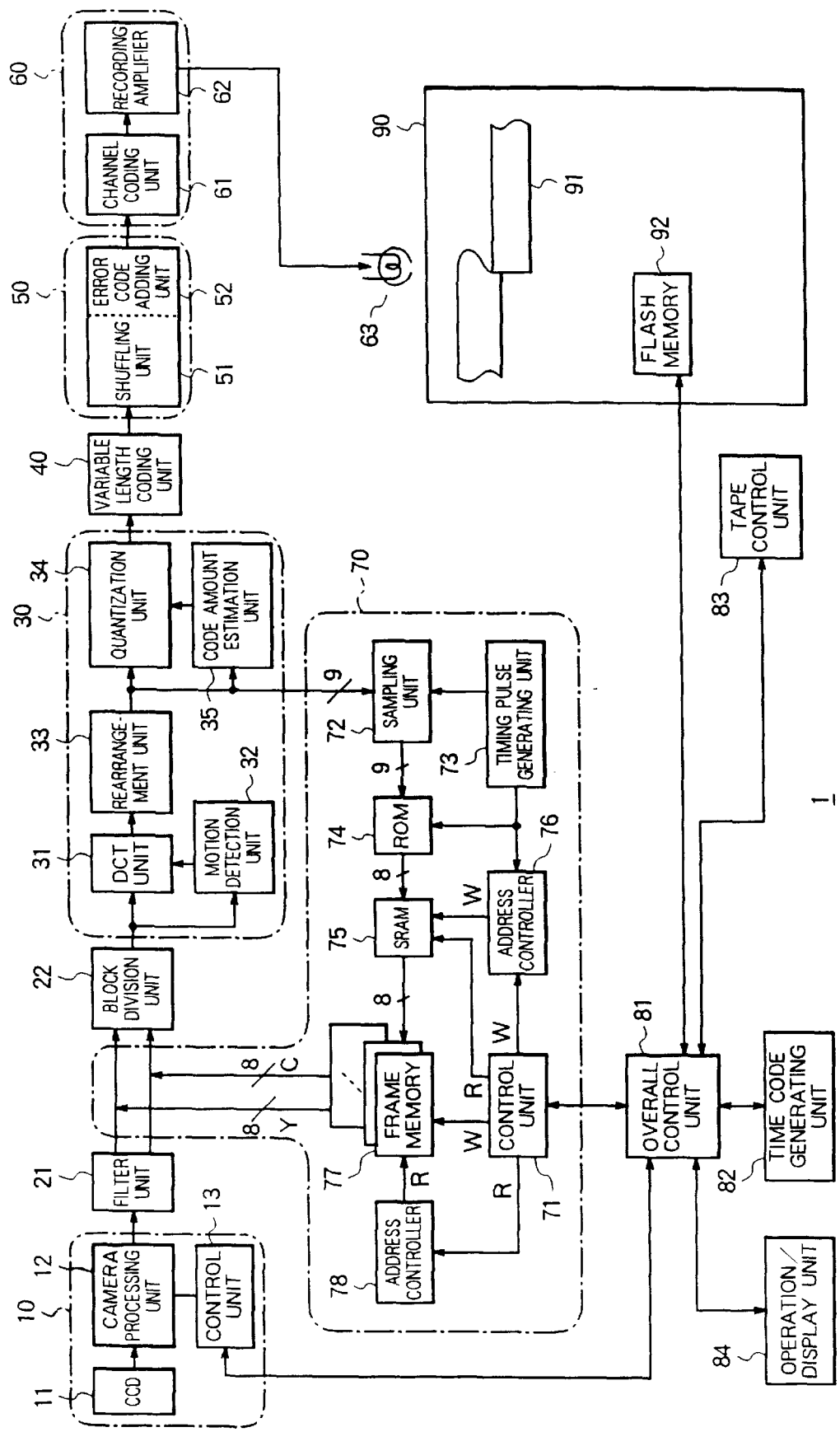
FIG. 1 is a block diagram of the configuration of a digital camcorder of an embodiment of the present invention.

FIG. 1 is a block diagram of the configuration of a video data recording apparatus of an embodiment of the present invention.

A digital camcorder 1 is a digital video tape recorder with a built-in camera (hereinafter referred to as a digital camcorder) which has, as principal units, a camera unit 10, a compression unit 30, an error correction code adding unit 50, a recording unit 60, an index image generating unit 70, and an operation/display unit 84. It compresses the video data obtained by shooting and records the same on the tape in a video cassette containing a semiconductor memory therein.

Figure 2:
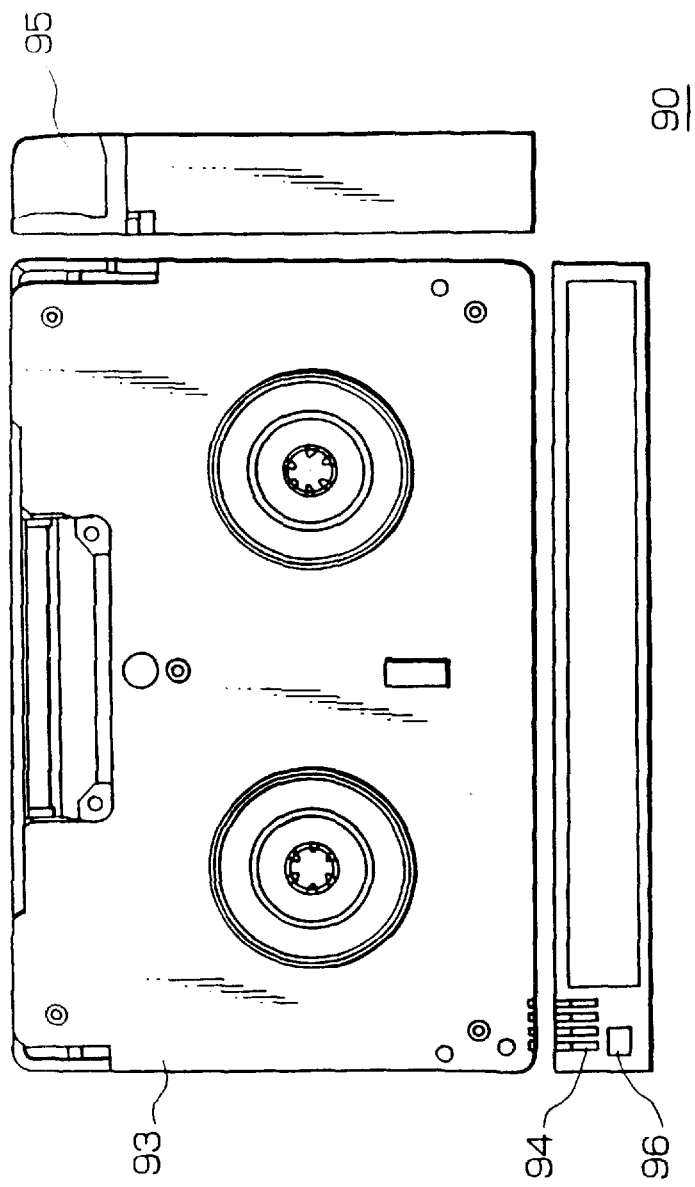
FIG. 2 is a view relating to the recording medium of the present invention and shows the outer appearance of the video cassette tape on which the video data is recorded by the digital camcorder shown in FIG. 1.

Regarding the recording medium of the present invention, the outer appearance of the video cassette accommodating the tape on which the video data is recorded is shown in FIG. 2.

First, an explanation will be made of this video cassette 90 used set in the digital camcorder 1 by referring to FIG. 1 and FIG. 2.

As shown in FIG. 2, the video cassette 90 accommodates a ¼ inch video tape 91 inside it and can record a signal of 4 hours and 30 minutes in the case of a current television signal. When this video cassette 90 is set in the digital camcorder 1, a lid 95 provided at the front surface of the cassette case 93 opens. The video tape 91 is drawn from this part and wound around not illustrated heads in the digital camcorder 1 where the signal is recorded and played back.

Further, the video cassette 90 incorporates a flash memory 92 referred to as a memory-in chip (MIC) inside the cassette case 93. A terminal section 94 comprising four terminals is provided in the vicinity of an erroneous erasure prevention pawl 96 of the back surface of the video cassette 90. Data is written to and read out from the flash memory 92 via this terminal section 94. More specifically, these four terminals are the ground, power source, clock, and data terminals.

Data is written into and read out from this flash memory 92 in units of data packs of 5 bytes. Other than data such as the tape thickness, type of tape, kind of tape, etc. recorded as the basic data, use may be made of any data storage. Note that the format of data and the write/read operation according to the present invention will be explained later.

Next, an explanation will be made of the configuration of the digital camcorder 1 by referring to FIG. 1.

The camera unit 10 has a CCD 11, a camera processing unit 12, and a control unit 13 for controlling these. It converts the signal captured by the CCD 11 to a television signal and outputs it to a filter unit 21 in accordance with a control signal from an overall control unit 81.

The filter unit 21 is a filter unit for carrying out the processing for converting the video signal input from the camera unit 10 from a 4:2:2 system to a 4:1:1 system etc. The converted video signal is output to a block division unit 22.

The block division unit 22 divides the frames of the video signal input from the filter unit 21 and the signal of the index image input from the index image generating unit 70 mentioned later into macro blocks each consisting of 8×8 pixels and outputs the same to the compression unit 30.

The compression unit 30 has a DCT unit 31, a motion detection unit 32, a rearrangement unit 33, a quantization unit 34, and a code amount estimation unit 35, carries out DCT coding on the video signal input from the block division unit 22, and further quantizes this and outputs the resultant data to a variable length coding unit 40. In the compression unit 30, motion detection is carried out with respect to the video signals for every macro block consisting of 8×8 pixels input from the block division unit 22 at the motion detection unit 32, DCT transformation is carried out at the DCT unit 31, and the obtained elements are rearranged by the rearrangement unit 33 in the order of frequency so that the DC component thereof comes to a predetermined position. Then, based on the result thereof, the code amount is estimated at the code amount estimation unit 35, the quantization level is determined based on the estimated value, and adaptive quantization is carried out at the quantization unit 34.

The variable length coding unit 40 carries out variable length coding on the compressed and further quantized video signal which is input from the compression unit 30 and outputs the code data generated to the correction code adding unit 50. In the present embodiment, two-dimensional Huffman coding is carried out in the variable length coding unit 40.

The error correction code adding unit 50 adds parity to the code data input from the variable length coding unit 40 to generate the recording data and outputs the same to the recording unit 60. In the present embodiment, the error correction code adding unit 50 uses a Reed-Solomon product code obtained by composing the error correction block in two dimensions. More specifically, the error correction code adding unit 50 has a shuffling unit 51 and an error correction code adding unit 52, adds outer code parity to the input code data at the error correction code adding unit 52 at first, carries out shuffling at the shuffling unit 51, and then adds a synchronization signal and ID code to this and further adds an inner code parity at the error correction code adding unit 52 again.

The recording unit 60 has a channel coding unit 61, a recording amplifier 62, and a recording head 63, converts the recording data input from the error correction code adding unit 50 to a digital bit train suited to the magnetic recording characteristics of the video tape 91 at the channel coding unit 61, amplifies this at the recording amplifier 62, applies the same to the recording head 63, and records this at a predetermined position of the video tape 91.

The index image generating unit 70 extracts an index image suitable for retrieving the contents of cuts for every series of video data (hereinafter referred to as cuts) obtained by shooting a range of a desired scene respectively determined by the cameraman via the operation/display unit 84 from among the video signal inputs from the compression unit 30. It further generates the index image (sometimes referred to as the index picture) by using the index image extracted for a plurality of cuts and appropriately outputs the same to the block division unit 22 at a predetermined timing so that it is recorded on the video tape 91 after the video data of the cuts are recorded.

The index image generating unit 70 has a control unit 71, a sampling unit 72, a timing pulse generating unit 73, a ROM 74, a SRAM 75, a SRAM address controller 76, a frame memory 77, and a frame memory address controller 78.

The control unit 71 controls the units constituting the index image generating unit 70 based on the control signal from the overall control unit 81. Particularly, it controls the units so as to extract the index image for all of the cuts determined in range by the cameraman by the operation/display unit 84. Details of the content of the control of the control unit 71 will be explained at the same time as the explanation of the units mentioned later.

The sampling unit 72 reads and fetches the coefficient of the DCT result rearranged by the rearrangement unit 33 of the compression unit 30 at a predetermined timing based on a pulse input from the timing pulse generating unit 73, extracts the DC component thereof, and outputs the same to the ROM 74.

The timing pulse generating unit 73 generates a pulse with respect to the sampling unit 72 so as to extract the images used for the index image from among the initial video data of the cuts. Note that, the signal of the division between the cuts is determined by the cameraman and input to the timing pulse generating unit 73 via the overall control unit 81.

The ROM 74 converts the data of the DC component of 9 bits input from the sampling unit 72 to 8 bits of data and outputs the same to the SRAM 75.

The SRAM 75 is controlled in its address by the SRAM address controller 76 and further is controlled in the write/read timing of the data by the control unit 71, successively stores one set of data per each macro block input from the ROM 74, and finally stores the image corresponding to the initial video data of each of the cuts. As mentioned before, in the sampling unit 72, one DC component is successively output as the pixel value thereof for every macro block consisting of 8×8 pixels, therefore the image finally stored in the SRAM 75 becomes the image obtained by reducing the original video data to ⅛ in the vertical and lateral directions, respectively.

The SRAM address controller 76 controls the address of the SRAM 75 so that the pixel data successively input from the ROM 74 to the SRAM 75 is stored in the SRAM 75 so that one image is formed based on the control signal from the control unit 71.

The frame memory 77 is a memory which can store the data corresponding to a frame of the video data. The frame memory 77 of the present embodiment has a capacity for storing 7 frames worth of video data. The frame memory 77 is controlled in its address by the frame memory address controller 78 and successively stores an image for each of the cuts successively formed in the SRAM 75 based on a control signal input from the control unit 71. Note that, the image stored in the SRAM 75 is an image obtained by reducing the original image data to ⅛ in the vertical and lateral directions, respectively, that is, reducing the surface area to 1/64, so 64 images can be stored in one frame worth of space of the frame memory 77.

The frame memory address controller 78 controls the address of the frame memory 77 so that the image data input from the SRAM 75 to the frame memory 77 is suitably stored at the position as mentioned before based on a control signal from the control unit 71.

The time code generating unit 82 is a counting means which generates a time code which becomes an indicator indicating the recording position of a signal etc. and outputs the same to the overall control unit 81. Note that, the time of output is an absolute time or a relative time reset by attachment and detachment of the video cassette 90 and the depression of the reset button of the cameraman. This may be arbitrarily selected.

The tape control unit 83 controls the tape travel of the video tape 91 of the video cassette 90 with a good precision so that the input video signal or the signal of the index image generated at the index image generating unit 70 can be recorded at any position of the video tape 91.

The operation/display unit 84 is a user interface for inputting the instructions for the control of the shooting conditions of the camera, recording start, recording end, marking etc. by the cameraman with respect to the digital camcorder 1 and for informing the cameraman of the operating state of the digital camcorder 1.

Further, particularly in the digital camcorder 1 of the present embodiment, inputs of the start of recording, ending, designation of cut, the cancellation (NG) of the designation of that cut, etc. are carried out via this operation/display unit 84.

The start and ending of recording are the instructions as to whether the video data input to the video tape 91 is to be actually recorded.

The designation of cut is an operation for designating the video data as a cut where desired video data is recorded. In the successively input video data, when the desired matter starts, the cameraman carries out an operation for indicating that this point is the start of the desired video data, that is, the start of a cut. This operation is referred to as a "mark-in". Further, the cameraman carries out an operation for reporting that the desired video data is ended in the video data which has been marked in. This operation is called a "mark-out". By carrying out this mark-in and mark-out, the cameraman designate a cut in the successively shot video data.

Further, where the video data which has once been designated as a cut turns out not to be desired video data, the NG operation is used to cancel the designation of that cut.

The actual arrangement of the operation units of the operation/display unit 84 in the digital camcorder 1 according to the present invention will be explained by referring to FIG. 3 and FIG. 4.

Figure 3:
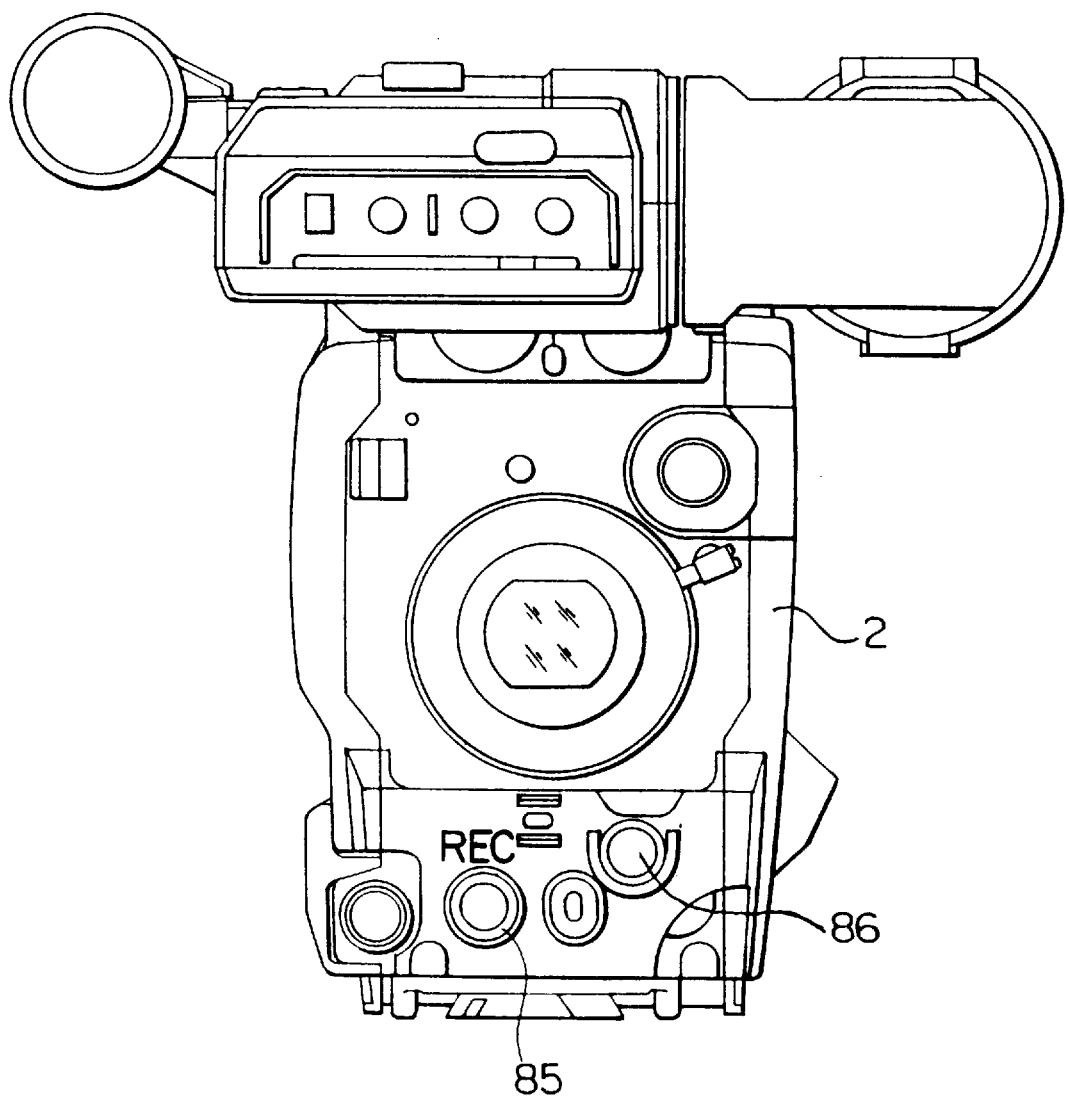
FIG. 3 is a view of a digital camcorder from the front surface on which a lens portion is not mounted for explaining an operation/display unit of the digital camcorder shown in FIG. 1.

FIG. 3 is a view of the digital camcorder 1 from the front; and FIG. 4 is a view of the front portion of the digital camcorder 1 from the side. Note that FIG. 3 shows the state where the lens part is not mounted on the digital camcorder 1, and FIG. 4 is a view showing the state where the zoom lens is mounted when the digital camcorder 1 is used as a shoulder type.

As shown in FIG. 3 and FIG. 4, the operating parts such as the various buttons and knobs are arranged at portions of the outer surface of the digital camcorder 1 and constitute the operation/display unit 84.

In such a digital camcorder 1, the operation panel provided at the front lower surface of the body 2 is provided with a REC button 85 for instructing the start/end of the recording and a mark-in/out button 86 for designating a cut. In the present embodiment, these REC button 85 and mark-IN/OUT button 86 are toggle switches. The fact that the camcorder is in the middle of recording or in the middle of designating a cut may be seen by these. Further, an NG button 87 for cancellation of designation of a cut is provided at the side portion of the body 2 in the vicinity of the mark-in/out button 86. In this way, these buttons are provided close enough that they can be depressed by the fingers of one hand of the cameraman. Therefore the designation of the start/end of recording, mark-in/out, and NG can be easily carried out instantaneously based on the decision of the cameraman.

Note that, the illustrated buttons 85 to 87 are buttons mainly used where the digital camcorder 1 is mounted on a tripod or the like for use. For example, as shown in FIG. 4, when it is used as a shoulder type, similar buttons separately provided on the zoom lens 3 are usually used. In the zoom lens 3, similar buttons for this purpose are provided in the vicinity of the manual zoom lever though not illustrated.

The overall control unit 81 controls the units constituting the digital camcorder 1 so that the digital camcorder 1 carries out the desired operation. For example, it controls the camera with respect to the camera unit 10, the generation and output of the video signal from the camera unit 10, the control of the operation with respect to the signal processing system of the compression unit 30 and subsequent units, the control of driving of the video tape with respect to the tape control unit 83, the display of the operating state and processing results with respect to the operation/display unit 84, etc. based on the instructions for camera control, recording start/end of the video data, etc. input by the cameraman via the operation/display unit 84.

Particularly, as the operation according to the present invention, the units of the digital camcorder 1 are controlled so that the input video data is successively recorded on the video tape 91 of the video cassette 90 based on the operation for recording the start/end of the video data input by the cameraman via the operation/display unit 84.

Further, the cameraman determines the position of a cut based on the operation for the mark-in and mark-out input via the operation/display unit 84, records the information of the recording position thereof in the flash memory 92 of the video cassette 90 and, at the same time, controls the index image generating unit 70 so as to extract the index image for the cuts.

Further, the cameraman inputs an NG operation through the operation/display unit 84 based on which he cancels a predetermined cut indicated when carrying out the NG operation from the designations of the cuts. Namely, the information of the recording position of the video data recorded in the flash memory 92 when the mark-in or mark-out is carried out is erased and the index image which is extracted from the cuts and recorded in the SRAM 75 or the frame memory 77 is erased. Note that, in the present embodiment, it is assumed that the processing by the NG operation for making a cut invalid is applied to the cut last marked in before the NG button was depressed.

Further, the overall control unit 81 controls the units of the digital camcorder 1 so that the index image for the cuts generated at the index image generating unit 70 of all cuts recorded on the video cassette 90 are output from the index image generating unit 70 to the block division unit 22 together with the newly recorded cut in a series of video data when a series of shooting is carried out and the recording of the video data is ended and the resultant index image is recorded in the video cassette 90. Then, further, the positions on the video tape 91 at which these cuts and index image are recorded are recorded in the flash memory 92 of the video cassette 90 at that time.

The input and output of the data indicating the recording positions of the video data to and from the flesh memory 92 of the video cassette 90 are carried out by using data packs of 5 bytes each as mentioned before. The memory configuration of the cassette memory will be explained by referring to FIGS. 5A to 5D.

Figure 5A:
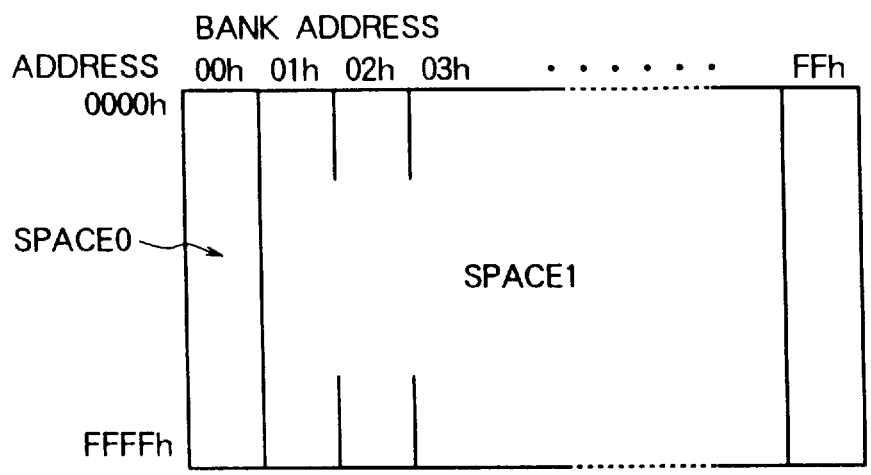

FIG. 5A is a view of the memory space of the cassette memory, in which one bank is constituted by 64 Kbytes, there are 256 banks, and thus there is a space of 128 Mbits at the maximum. The bank 0 is referred to as a space 0, while the other banks will be referred to as a space 1. A large volume of data such as image data is stored in the space 1. Additional data other than the image data, for example, the data indicating the thickness of tape, is stored in the space 0.

Figure 5B:
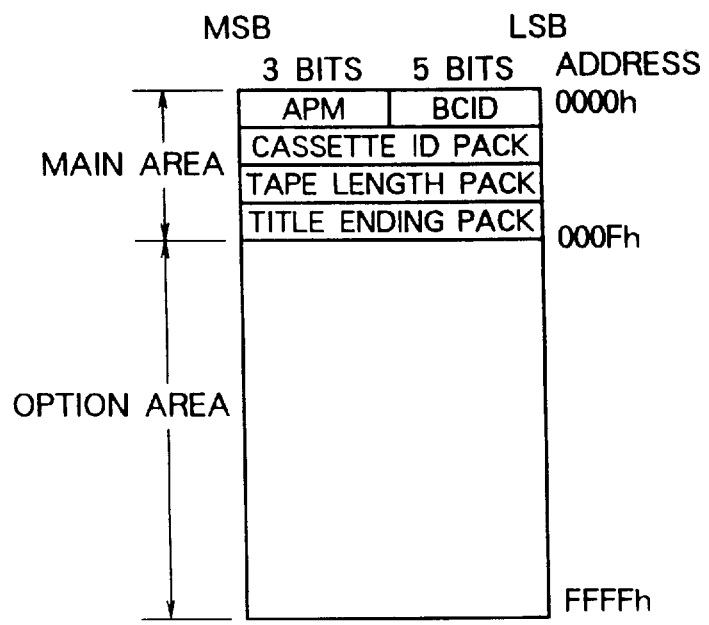

FIG. 5B is a view of the data configuration of the space 0. The 16 bytes worth of data from the address 0 constitute the main area. The other part is comprised by an option area containing the space 1. At the address 0000h of the space 0, the data is comprised of the APM (Application ID of Memory Cassette) and BCID (Basia Cassette ID). The APM indicates a new tape when for example "111" is assigned. BCID indicates the thickness of tape, type of tape (MP tape or ME tape etc.), and the grade of tape (home video use or business video use). The 5 bytes' worth of data from the address 0001h to 0005h of the space 0 indicates the cassette ID pack. The information concerning the configuration of the cassette memory which is actually mounted in the cassette and more detailed information of the tape thickness are stored in this. In the 5 bytes worth of area from the address 0008h to 000Ah of the space 0, a value obtained by converting the tape length to the number of tracks is stored as the tape length pack. If the absolute track number of the position where the head exists at present is subtracted from this value, the remaining amount of tape can be correctly calculated. The 5 bytes' worth of area in the third pack indicates the final position of recording of the tape heretofore as the title ending position pack. The area after this final position of recording is the non-recording area in which data has not been recorded. The option area appears in the 17th byte and subsequent bytes in terms of address. In this area, the data is recorded as an set of packs referred to as an event. Then, the data pack of the data indicating the position of the recording data is recorded in this option area.

FIGS. 5C and 5D are views of the configuration of the data pack of the data indicating the position of the recording data recorded in the flash memory 92 of the video cassette 90; wherein FIG. 5C is a view of the configuration of the data pack indicating the positions of the in-point and out-point of the cut; and FIG. 5D is a view of the configuration of the data pack indicating the position of an index image.

First, in all of the data packs, the first byte becomes the header where the code for identifying the type of these data packs is recorded. All of the data packs shown in FIG. 5C and FIG. 5D are data packs of data indicating the positions of the video data recorded on the video tape 91. A code FDh is recorded in this header.

Next, in the data pack indicating the positions of the video data, a sub-header is comprised by three bits of a bit 7 ($b_2$) and bit 6 ($b_1$) of the second byte and a bit 7 ($b_0$) of the third byte. By this sub-header, the contents of data of the data packs are identified. Also the data format thereof can be distinguished in accordance with this. The correspondence of the sub-header and the data contents is shown in Table 1.

TABLE 1

| $b_2 b_1 b_0$ | Type of data pack | Main data content |
|---|---|---|
| 000 | Picture clip address | Recording position of index image |
| 001 | Picture clip 1 | Recording position of each cut |
| 010 | Picture clip 2 | Recording position of each cut |

Below, an explanation will be made of the configuration of the data packs. Note that, in FIG. 5C and FIG. 5D, bits for which no definitions are indicated are reserve regions.

The picture clip 1 (PC1) and picture clip 2 (PC2) shown in FIG. 5C are data packs for recording the identification information of the video data of the cuts recorded on the video tape 91 and the information of the recording position thereof.

The identification information of the cuts is recorded in the second byte to fourth byte of the picture clip 1 (PC2), more specifically the scene number of the scene, take number, and the data for discriminating whether the cut is OK or NG input by the cameraman via the operation/display unit 84 are recorded.

The information indicating the header position of the recording region on the flash memory 92 in which the video data of the cuts is recorded in the second byte to the fourth byte of the picture clip 2. In the present embodiment, the recording position thereof is indicated by the recording time on the video tape 91. The hour is recorded in the second byte, the minute is recorded in the third byte, and the second is recorded in the fourth byte. Note that, the start of recording of this video data is determined according to the instruction performed by operation of the digital camcorder 1 by the cameraman. Therefore it is sufficient so far as it can be managed in units of seconds. It is sufficient even if it is not managed in units of frames.

Further, the information indicating the ending position of the recording region of that cut is indicated by a relative value from the header position. Namely, after which seconds from the header position or at which frame is the ending position of the recording region of that cut located is recorded as the information of the ending position thereof. The information indicating this ending position is recorded in the fifth byte of the picture clip 1 or in the fifth byte of the picture clip 2. This ending position may be determined by using seconds as the unit or determined by using frames as the unit. Since the recording bit width is 16 bits, where a relative value using seconds as a unit is used, it can handle data for 18 hours, and while where a relative value using frames as a unit is used, it can handle about 36 minutes worth of cuts. According to the type of the video data to be recorded and the precision required at the editing etc., this ending position may be indicated with any unit as a reference.

The picture clip address (PC Add) shown in FIG. 5D is a data pack indicating the information of the recording position of the index image recorded on the video tape 91. In the present embodiment, the recording position thereof is indicated for every frame of index picture. Namely, the time is recorded in the second byte, the minute is recorded in the third byte, the second is recorded in the fourth byte, and the frame number within the second is recorded in the fifth byte.

Such a data pack is generated by the overall control unit 81 as information concerning the recording position of the video data recorded on the video tape 91 and appropriately recorded in the flash memory 92 of the video cassette 90.

Next, an explanation will be made of the operation of the digital camcorder 1 by referring to FIG. 6 and FIG. 7.

FIG. 6 is a view explaining the method for generating an index image in the index image generating unit 70 of the digital camcorder 1.

Figure 7:
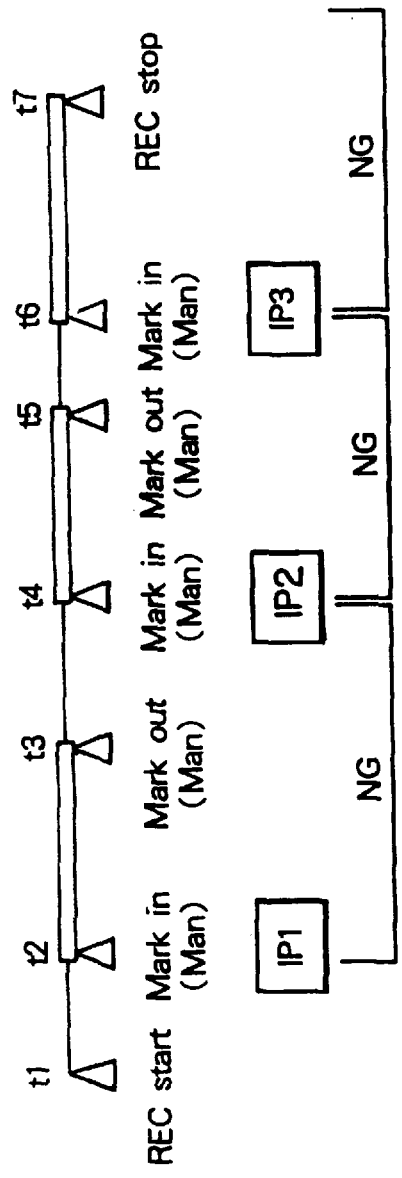
FIG. 7 is a view explaining the operation of the digital camcorder shown in FIG. 1.

FIG. 7 is a view for explaining the operation of the digital camcorder 1.

Note that, the present embodiment shows a case where this digital camcorder 1 is used for coverage in a television broadcasting station etc., and this operation will be explained for the case where the video data of desired scenes is successively selected as necessary cuts by the decision of the cameraman while shooting the video.

First, assuming the cameraman decides to record the video and audio data captured by the digital camcorder 1 at the time t1, he instructs the recording operation by depressing the REC button 85 of the operation/display unit 84 of the digital camcorder 1. The instruction to start the recording input to the operation/display unit 84 is input to the overall control unit 81. The overall control unit 81 then controls the different units for the recording of the video data.

In the camera unit 10, the signal obtained by the CCD 11 is output as the video data based on a control signal from the overall control unit 81. The filter unit 21 adjusts the system, then the block division unit 22 divides the video data for every field into macro blocks and the compression unit 30 carries out DCT coding to compress the macro blocks. The compressed video data are coded at the variable length coding unit 40, the error correction code is added to this at the error correction code adding unit 50, and this is transformed to the recording signal at the recording unit 60.

Then, simultaneously, the tape control unit 83 controls the position of the video tape 91 based on the control signal from the overall control unit 81 so that the signal is applied to the recording region of the video tape 91 in which the video data should be recorded from the recording head 63. Then, the successively input video data is successively recorded in the predetermined recording region of the video tape 91 by the recording head 63 of the recording unit 60.

The cameraman depresses the mark-in/out button 86 at the time t2 when the desired scene is obtained while shooting the video. At this time, information indicating that the video data to be input after the time t2 is the desired video data, that is, it is the video data having a high possibility of use as a cut, is input. When the mark-in signal is input via the operation/display unit 84, the overall control unit 81 reads and fetches the time code by the time code generating unit 82, generates the data pack as shown in FIG. 5C, and records the information of the position of start of recording of this cut on the video tape 91 in the flash memory 92 of the video cassette 90. Further, the overall control unit 81 makes the index image generating unit 70 extract the index image IP1 from that cut.

In the index image generating unit 70, a reduced image IP1 for identifying the cut is extracted from the initial video data of the cut for which input has been started. It is arranged on one frame together with the reduced image of the other cuts to generate the index image.

As shown in FIG. 6, the video data 101 of the first field input from the camera unit 10 is divided into macro blocks 102 each consisting of 8×8 pixels at the block division unit 22. DCT transformation is performed at the DCT unit 31 for every macro block 102. Then, the result of the DCT is rearranged to the data 103 such that the DC component thereof comes first in the rearrangement unit 33. This DC component is extracted by the sampling unit 72 of the index image generating unit 70.

The sampling unit 72 extracts this DC component from the macro block of the initial image data 101 and successively inputs the same to the SRAM 75 via the ROM 74. As a result, on the SRAM 75, the reduced image 104 as shown in FIG. 6 is formed.

When the reduced image 104 is extracted from the initial video data of the video data for which input has started, this reduced image is arranged at a predetermined position of the frame memory 77. Sixty-four reduced images 104 can be arranged in one frame since they are images obtained by reducing a macro block of 8×8 pixels with a predetermined ratio, that is, in the present embodiment, they are images obtained by reducing the original frame to 1/64. For example, as shown in FIG. 6, the reduced image 104 obtained from the cut recorded first is arranged at for example the left top region of the frame memory 77.

When the desired scene ends during the shooting of this cut (time t3), the cameraman depresses the mark-in/out button 86 again. As a result, the overall control unit 81 reads the information indicating the position of the cut as shown in FIG. 5C which has been already recorded in the flash memory 92, sets the data indicating the ending position of the data of that cut in the fifth byte of each of the two data packs, and records the same in the flash memory 92 again. Note that, this ending position is indicated by the relative position from the previously recorded header position.

Even if the mark-in/out button 86 is depressed, the recording of the video data is continued (time t3 to t4), therefore no other operations are particularly required and the next operation is awaited.

Where the mark-in/out button 86 is depressed in this state again (time t4), similar to the above description, a data pack where a time code with respect to the new cut is recorded is recorded in the flash memory 92 and, at the same time, the index image IP2 is extracted at the index image generating unit 70.

Further, where the NG button 87 is depressed at any time, the selection of the data which was marked in before the depression of that NG button data as a cut is made invalid. In the example shown in FIG. 7, where the NG button 87 is depressed during a period from the time t2 to the time t4, the first cut obtained during the period from the time t2 to the time t3 is erased; where the NG button 87 is depressed during a period from the time t4 to the time t6, the second cut obtained during the period from the time t4 to the time t5 is erased; and where the NG button 87 is depressed after the time t6, the third cut obtained during a period from the time t6 to the time t7 is erased.

In the present embodiment, the data pack indicating the positional information of the cut recorded in the flash memory 92 is erased and the index image of that cut recorded in the SRAM 75 or the frame memory 77 is erased. Note that, where the end of the cut has not yet been indicated and the video data being input is recorded as the data of the desired cut, the designation of the video data as a cut is cancelled.

The recording of the video data successively recorded while the cuts are being selected in this way is stopped when the REC button 85 is depressed again (time t7). As shown in FIG. 7, where the REC button 85 is depressed to instruct the ending of recording when the designation of the cut has not been cancelled, processing for ending the cut is first carried out, then the recording of the video data is ended. The instruction for the ending of recording is input to the overall control unit 81. The overall control index 81 carries out the control for the recording of the video data by the units. As a result, the output of the video signal from the camera unit 10 is ended, and the recording of that video data is ended. Then, subsequent to the signal of that video data, the index image generated at the index image generating unit 70 is recorded on the video tape 91.

More specifically, the index image to be recorded in the frame memory 77 of the video index image generating unit 70 is input to the block division unit 22, compressed at the compression unit 30, subjected to variable length coding at the variable length coding unit 40, given an error correction code at the error correction code adding unit 50, and recorded as the resultant data on the video tape 91 via the recording unit 60. At this time, this index image is the last of all video data continuously recorded on the video cassette 90. This is recorded in the recording region following that video data.

Note that, this index image is an image in which all of the reduced images of the cuts successively recorded in the video cassette 90 heretofore are arranged.

Further, at this time, the overall control unit 81 generates the data pack indicating the recording position of the index image and records this in the flash memory 92.

Next, when the recording of the video data is instructed again by the cameraman, the overall control unit 81 carries out a similar operation to that mentioned before and successively records the video data on the video tape 91. At this time, the overall control unit 81 controls the position of the video tape 91 with respect to the tape control unit 83 so as to continuously record the new video data in the recording region of the previous video data. Namely, the index image recorded after the previous video data is updated and a new video data is recorded on this. For this reason, concretely, the tape control unit 83 will slightly rewind the video tape 91.

As explained above, in the digital camcorder 1 of the present embodiment, when a desired scene occurs, the cameraman operates the mark-in/out button 86 provided in the vicinity of the REC button 85 to select this scene as a cut. The selection of this cut is a separate operation from the recording of the video data. Also, the video data before and after that cut have been recorded. Therefore the desired scene can be recorded without fail.

For this cut, the leading position and ending position thereof are recorded in the flash memory 92 of the video cassette 90, an index image in which a plurality of video data of the head of each of the cuts are arranged on a frame after reduction is generated and recorded, and further also the recording position of this index image is recorded in the flash memory 92.

Accordingly, where editing is carried out, the index image is read at a high speed based on the positional information of the index image recorded in the flash memory 92, the contents of the cuts are displayed all at once for confirmation, and the cuts selected by this can be read at a high speed based on the positional information of each cut similarly recorded in the flash memory 92.

Note that, the present invention is not limited to the present embodiment. Various modifications are possible.

For example, in the digital camcorder 1, when depressing the REC button 85 to start the recording, as the initial state, the video data is recorded in a state where no designation that this data is valid video data, that is, a cut, is carried out. However, it is also possible to adopt a configuration wherein the REC button 85 also carries out the function of the mark-in/out button 86 and immediately processes the video data as a first cut when the recording of the data is started.

Further, conversely, when ending the recording, in the present embodiment, when ending the recording in a state where the designation of the cut has not been ended, it is regarded that the cut is ended at that point of time. However, where the functions of the REC button 85 and the mark-in/out button 86 are completely separated, it is also possible to carry out an operation discarding that cut when the REC button 85 is depressed when the designation of the cut has not been ended.

Further, in the present embodiment, the point of time when the mark-in/out button 86 was depressed was regarded as the time of the start and end of the cut. The recording of the video data is continued irrespective of the existence of designation of the cut. Therefore even if the mark-in/out button 86 is depressed at an instant when the intended scene occurs, a cut which more suitably records the scene in question can be extracted if a slightly longer out than the actually designated cut in the front and back direction is selected at the time of editing. In for example the digital camcorder 1, however, if a time before the time at which the mark-in/out button 86 is depressed is recorded as the start of the cut in advance, it becomes unnecessary to carry out an operation to adjust the cut at the time of editing. Similarly, at the ending position of a cut, in accordance with the scene in question, the time a predetermined time before or after the point of time at which the mark-in/out button 86 is depressed may be defined as the ending position of that cut.

Further, in the digital camcorder 1, both the mark-in and mark-out operations are designated by the mark-in/out button 86. Namely, a cut is designated by the pair of the mark-in operation performed by depressing the button at first and the mark-out operation performed by depressing the mark-in/out button 86 again. However, for example, a configuration wherein the button for designating the mark-in and the button for designating the mark-out are different can also be adopted. In this case as well, it is considered that usually the mark-in and mark-out are designated as a pair, therefore the same operation as that in the present embodiment is carried out. However, where the button of the mark-in operation and the button of the mark-out operation are different, there can be considered a case where the mark-in is continuously designated or the mark-out is continuously designated. In such a case, the operation designated later may be made valid. When doing this, the determination of a cut and the determination of the range of a cut can be easily redone.

Further, in the cut cancelling processing instructed by the NG button 87, the timing for depressing the NG button 87, the cut in question, etc. can be freely determined. As in the present embodiment, it is possible to make the NG processing with respect to the previous cut valid whenever depressing the NG button 87 up until the start of the next cut is indicated or possible to make the NG processing for cancelling that cut valid only before the ending of that cut.

Further, also the buttons of the REC button 85, the mark-in/out button 86, and the NG button 87 can be arranged at any positions.

Further, the index image etc. can be configured according to any method. The reduced images comprising the index image are images obtained by reducing the original video data to ⅛ in both of the vertical and lateral directions, that is, reducing the surface area to 1/64, therefore 64 images can be stored in one frame. However, when considering that the images formed in this frame memory are subjected to DCT again later, there is a concern that the image quality will be degraded in very small images, therefore preferably the number of the reduced images to be accommodated in one frame is reduced. For example, it is also possible to divide a frame into 64 and arrange the reduced images in every other region. Even by this, since the frame memory 77 of the index image generating unit 70 has a capacity of 7 frames, 224 (=32×7) images in total can be stored.

Of course, also the capacity of that frame memory 77 can be appropriately changed in accordance with the method of use of the digital camcorder 1.

Further, also the compression method when recording the video data Is not limited to 8×8 DCT. Any method can be adopted.

Further, also the method for extracting the reduced images by the index image generating unit can be arbitrarily changed. It is also possible to restore the compressed images by carrying out inverse DCT or generate the reduced images by thinning out the original input video data before the compression.

According to the present invention, there is provided a video data recording apparatus for recording video data using a tape-like recording medium accommodated in a cassette provided with a semiconductor memory by which it is possible to suitably determine the cuts and make effective use of the semiconductor memory to enable efficient editing.

What is claimed is:

1. A video data recording apparatus for recording video data on a tape-like recording medium in a cassette provided with a semiconductor memory, comprising:

indicating means for indicating a recording start and a recording end of said video data in response to input information;

recording means for continuously recording said video data on said tape-like recording medium based on said recording start and recording end received from said indicating means;

specifying means for specifying a beginning and an end of desired video data selected from the recorded video data;

detecting means for detecting a start position of the video data when said beginning of desired video data is specified by said specifying means, said detecting means detecting an ending position of the video data when said end of desired video data is specified by said specifying means, said detecting means designating the video data detected between said start position and said ending position as valid video data;

positional information recording means for recording in said semiconductor memory information indicating where said valid video data has been recorded on said tape-like recording medium; and cancellation informing means for indicating that the desired video data is not valid, said detecting means invalidating the designated valid video data corresponding to the detected start and ending positions in response to said cancellation informing means.

2. The video data recording apparatus as set forth in claim 1, further comprising: index generating means for generating index video data based on said valid video data to identify said valid video data, and index recording means for recording the generated index video data on said tape-like recording medium, said positional information recording means recording in said semiconductor memory another information indicating where said index video data has been recorded on said tape-like recording medium.

3. The video data recording apparatus as set forth in claim 2, wherein the generated index video data is comprised of a head of said valid video data.

4. The video data recording apparatus as set forth in claim 2, wherein said index generating means comprises index extracting means for extracting said index video data identifying said valid video data, and frame index generating means for generating said index video data by successively arranging said index video data on a screen by reducing the extracted index video data; said index recording means recording on said tape-like recording medium the generated index video data successively arranged as said video data of said frame.

5. The video data recording apparatus as set forth in claim 1, wherein said detecting means detects first timing information when said recording start is input to said indicating means and second timing information when said beginning of desired video data is specified by said specifying means as said start position of said valid video data, said detecting means detecting third timing information when said recording end is input to said indicating means and fourth timing information when said end of said desired video data is is specified by said specifying means as said ending position of said valid video data.

6. The video data recording apparatus as set forth in claim 1, wherein said detecting means detects a new start position subsequent to the detected start position of said valid video data in a case where said new start position is detected after the detected start position and before the detected ending position, said detecting means detecting a new ending position subsequent to the detected ending position of said valid video data in a case where said new ending position is detected after the detected ending position and before the detected start position.

7. The video data recording apparatus as set forth in claim 1, wherein said detecting means corrects said start position and said ending position of said valid video data to respective positions being at an earlier predetermined time such that the corrected start and ending positions define said valid video data.

8. The video data recording apparatus as set forth in claim 2, wherein said index recording means records the generated index video data after the recorded video data on said tape-like recording medium; and said recording means subsequently updates said index video data on said tape-like recording medium so that the video data which is continuously input to said video data recording apparatus is continuously recorded on said tape-like recording medium to record subsequent input video data.

9. The video data recording apparatus as set forth in claim 1, further comprising a camera for producing an image and for outputting the video data corresponding to the produced image.

10. The video data recording apparatus as set forth in claim 1, wherein said indicating means and specifying means are located in substantial proximity to each other.

11. A video data recording apparatus for recording video data on a tape-like recording medium in a cassette provided with a semiconductor memory, comprising:

a compression unit for coding an input video signal to generate compressed video data;

an operation unit for being operative to indicate a recording start and a recording end of the generated video data in response to input information;

a recording unit for continuously recording the generated video data on said tape-like recording medium based on said recording start and recording end received from said operation unit, said operation unit being operative to specify a beginning and an end of desired video data selected from the recorded video data; and a controller for detecting a start position of the video data when said beginning of desired video data is specified by said operation unit, said controller detecting an ending position of the video data when said end of desired video data is specified by said operation unit, said controller designating the video data detected between said start position and said ending position as valid video data, said controller storing information in said semiconductor memory indicating where said valid video data has been recorded on said tape-like recording medium.

12. The apparatus according to claim 11, wherein said operation unit is operative to indicate that the desired video data is not valid such that said controller invalidates in said semiconductor memory the designated valid video data corresponding to the detected start and ending positions in response to said operation unit.

13. The apparatus according to claim 11, further comprising an index image generator for generating index video data based on said valid video data to identify said valid video data, said recording unit recording the generated index video data on said tape-like recording medium, and said controller storing in said semiconductor memory another information indicating where said index video data has been recorded on said tape-like recording medium.

14. The apparatus according to claim 13, wherein the generated index video data is comprised of a head of said valid video data.

15. The apparatus according to claim 13, wherein said index image generator comprises an index extractor for extracting said index video data identifying said valid video data, and a frame index generator for generating said index video data by successively arranging said index video data on a screen by reducing the extracted index video data; said recording unit recording on said tape-like recording medium the generated index video data successively arranged as said video data of said frame.

* * * * *